United States Patent
Curtis et al.

(10) Patent No.: US 9,912,615 B2
(45) Date of Patent: Mar. 6, 2018

(54) DYNAMIC REMOVAL OF MAC TABLE ENTRIES BASED ON A MAC TABLE FULLNESS LEVEL

(71) Applicant: Verizon Patent and Licensing Inc., Arlington, VA (US)

(72) Inventors: Paul M. Curtis, Burlington, MA (US); Michael A. Tsukernik, Burlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 114 days.

(21) Appl. No.: 14/614,604

(22) Filed: Feb. 5, 2015

(65) Prior Publication Data

US 2016/0234134 A1    Aug. 11, 2016

(51) Int. Cl.
*H04L 12/935* (2013.01)
*H04L 12/56* (2006.01)
*H04L 12/24* (2006.01)
*H04L 29/12* (2006.01)

(52) U.S. Cl.
CPC ...... *H04L 49/3009* (2013.01); *H04L 61/6022* (2013.01)

(58) Field of Classification Search
CPC .. H04L 47/32; H04L 49/9084; H04L 47/2441

USPC ................... 707/E17.014; 370/473
See application file for complete search history.

(56) References Cited

U.S. PATENT DOCUMENTS

| | | | | |
|---|---|---|---|---|
| 2006/0002386 A1* | 1/2006 | Yik | ...................... | H04L 49/3063 370/389 |
| 2009/0182854 A1* | 7/2009 | Sun | ...................... | H04L 12/4625 709/223 |
| 2011/0292939 A1* | 12/2011 | Subramaian | ............ | H04L 45/54 370/392 |
| 2013/0077490 A1* | 3/2013 | Sela | ...................... | H04B 7/1858 370/235 |

\* cited by examiner

*Primary Examiner* — Asad Nawaz
*Assistant Examiner* — Jason Harley

(57) ABSTRACT

A device may store a data structure containing entries and times associated with the entries. The device may determine a fullness level associated with the data structure. The device may determine an expiration threshold based on the fullness level of the data structure. The device may identify a first group of entries, of the entries in the data structure, based on times associated with the first group of entries satisfying the expiration threshold. The device may remove the first group of entries from the data structure. The device may randomly select, based on a probability associated with the fullness level, a second group of entries of the entries in the data structure. The device may remove the second group of entries from the data structure.

20 Claims, 12 Drawing Sheets

Remove some MAC table entries based on an accelerated time-out threshold.
Remove other MAC table entries based on probabilistic random selection.

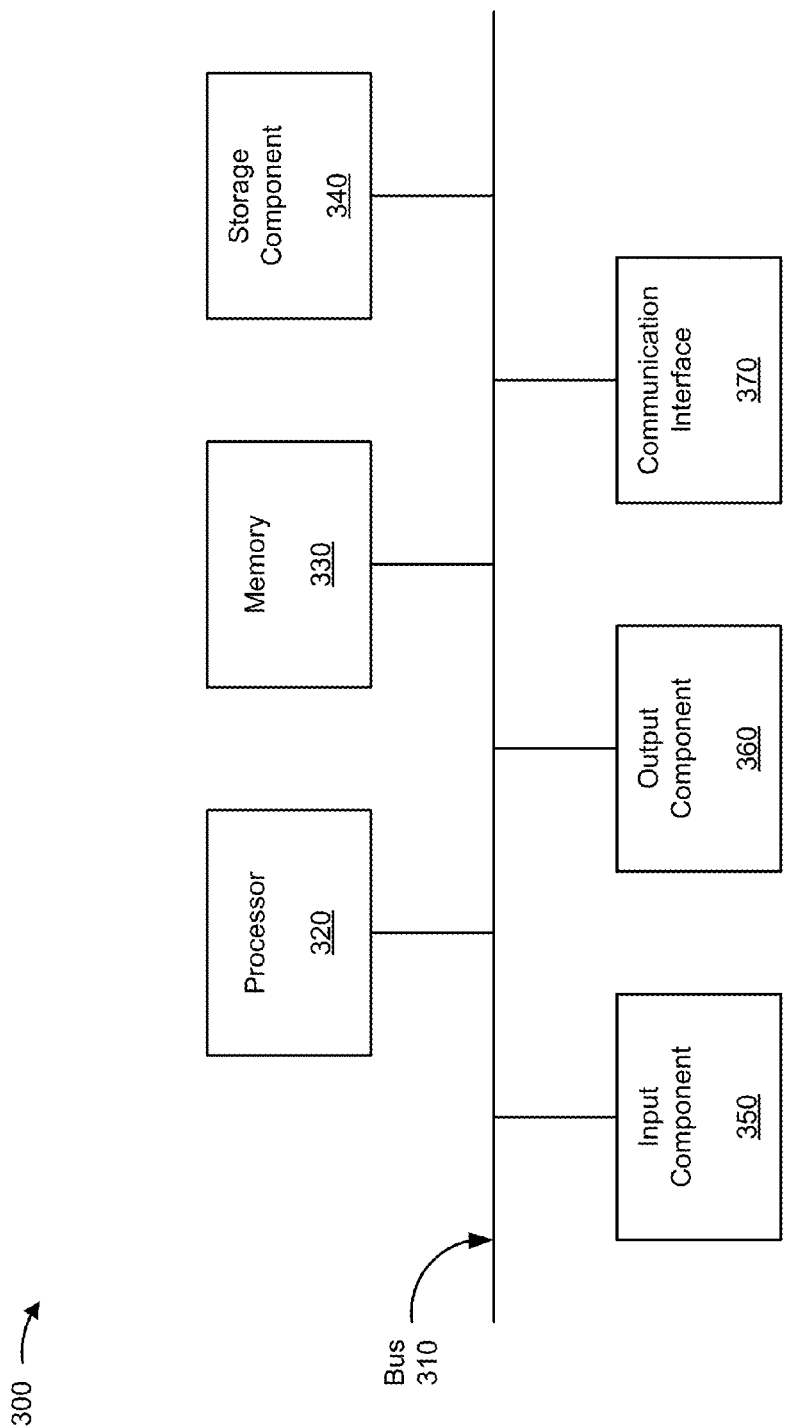

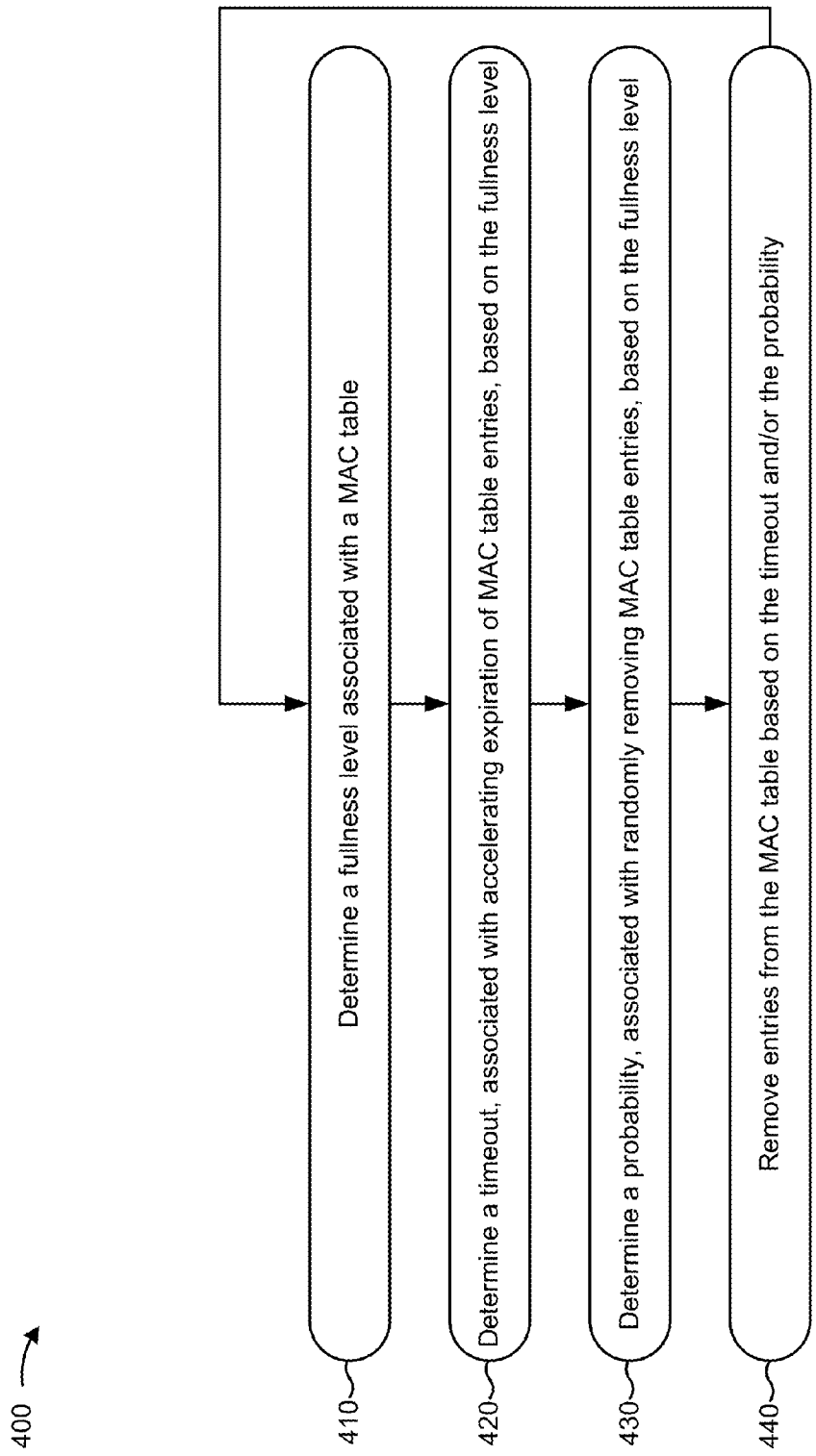

Physical Switch MAC Table

| Entry | MAC | Port | Time | Type |
|---|---|---|---|---|
| 1 | 1-0 | 1 | 1 | STA |
| 2 | 2-0 | 2 | 19 | STA |
| 3 | 3-0 | 3 | 23 | STA |
| 4 | 1-1 | 1 | 85 | DYN |
| 5 | 1-2 | 1 | 282 | DYN |
| 6 | 1-3 | 1 | 197 | DYN |
| 7 | 1-4 | 1 | 188 | DYN |
| 8 | 1-5 | 1 | 149 | DYN |
| 9 | 1-6 | 1 | 294 | DYN |
| 10 | 1-7 | 1 | 56 | DYN |
| 11 | 1-8 | 1 | 171 | DYN |
| 12 | 1-9 | 1 | 354 | DYN |
| 13 | 1-10 | 1 | 69 | DYN |
| 14 | 1-11 | 1 | 25 | DYN |
| 15 | 1-12 | 1 | 13 | DYN |
| 16 | 1-13 | 1 | 123 | DYN |
| 17 | 1-14 | 1 | 218 | DYN |
| 18 | 1-15 | 1 | 188 | DYN |
| 19 | 1-16 | 1 | 197 | DYN |
| 20 | 1-17 | 1 | 12 | DYN |
| 21 | 1-18 | 1 | 148 | DYN |
| 22 | 1-19 | 1 | 177 | DYN |
| 23 | 1-20 | 1 | 22 | DYN |
| 24 | 1-21 | 1 | 200 | DYN |
| 25 | 1-22 | 1 | 351 | DYN |
| 26 | 1-23 | 1 | 83 | DYN |
| 27 | 1-24 | 1 | 234 | DYN |
| 28 | 1-25 | 1 | 92 | DYN |
| 29 | 1-26 | 1 | 313 | DYN |
| 30 | 1-27 | 1 | 143 | DYN |
| 31 | 1-28 | 1 | 277 | DYN |
| 32 | 1-29 | 1 | 1 | DYN |
| 33 | 1-30 | 1 | 147 | DYN |
| 34 | 1-31 | 1 | 61 | DYN |
| 35 | 1-32 | 1 | 56 | DYN |
| 36 | 1-33 | 1 | 156 | DYN |
| 37 | 1-34 | 1 | 179 | DYN |
| 38 | 1-35 | 1 | 144 | DYN |
| 39 | 1-36 | 1 | 2 | DYN |
| 40 | 1-37 | 1 | 107 | DYN |
| 41 | 1-38 | 1 | 225 | DYN |
| 42 | 1-39 | 1 | 4 | DYN |
| 43 | 1-40 | 1 | 113 | DYN |
| 44 | 1-41 | 1 | 86 | DYN |
| 45 | 1-42 | 1 | 299 | DYN |
| 46 | 1-43 | 1 | 230 | DYN |
| 47 | 1-44 | 1 | 321 | DYN |
| 48 | 1-45 | 1 | 172 | DYN |
| 49 | 1-46 | 1 | 6 | DYN |
| 50 | 1-47 | 1 | 166 | DYN |
| 51 | 1-48 | 1 | 219 | DYN |
| 52 | 1-49 | 1 | 4 | DYN |
| 53 | 1-50 | 1 | 97 | DYN |
| 54 | 2-1 | 2 | 334 | DYN |
| 55 | 2-2 | 2 | 190 | DYN |
| 56 | 2-3 | 2 | 92 | DYN |
| 57 | 2-4 | 2 | 19 | DYN |
| 58 | 2-5 | 2 | 296 | DYN |
| 59 | 2-6 | 2 | 138 | DYN |
| 60 | 2-7 | 2 | 134 | DYN |
| 61 | 2-8 | 2 | 201 | DYN |
| 62 | 2-9 | 2 | 39 | DYN |
| 63 | 2-10 | 2 | 244 | DYN |
| 64 | 3-1 | 3 | 346 | DYN |
| 65 | 3-2 | 3 | 311 | DYN |
| 66 | 3-3 | 3 | 23 | DYN |
| 67 | 3-4 | 3 | 37 | DYN |
| 68 | 3-5 | 3 | 145 | DYN |
| 69 | 3-6 | 3 | 134 | DYN |
| 70 | 3-7 | 3 | 95 | DYN |
| 71 | 3-8 | 3 | 196 | DYN |
| 72 | 3-9 | 3 | 350 | DYN |
| 73 | 3-10 | 3 | 158 | DYN |
| 74 | 3-11 | 3 | 265 | DYN |
| 75 | 3-12 | 3 | 135 | DYN |
| 76 | 3-13 | 3 | 80 | DYN |
| 77 | 3-14 | 3 | 236 | DYN |
| 78 | 3-15 | 3 | 151 | DYN |
| 79 | 3-16 | 3 | 332 | DYN |
| 80 | 3-17 | 3 | 113 | DYN |

FIG. 5B

Virtual Switch 1 MAC Table

| Entry | MAC | Port | Time | Type |
|---|---|---|---|---|
| 1 | 1-1 | 1 | 85 | DYN |
| 2 | 1-2 | 2 | 282 | DYN |
| 3 | 1-3 | 3 | 197 | DYN |
| 4 | 1-4 | 4 | 188 | DYN |
| 5 | 1-5 | 5 | 149 | DYN |
| 6 | 1-6 | 6 | 294 | DYN |
| 7 | 1-7 | 7 | 56 | DYN |
| 8 | 1-8 | 8 | 171 | DYN |
| 9 | 1-9 | 9 | 354 | DYN |
| 10 | 1-10 | 10 | 69 | DYN |
| 11 | 1-11 | 11 | 25 | DYN |
| 12 | 1-12 | 12 | 13 | DYN |
| 13 | 1-13 | 13 | 123 | DYN |
| 14 | 1-14 | 14 | 218 | DYN |
| 15 | 1-15 | 15 | 188 | DYN |
| 16 | 1-16 | 16 | 197 | DYN |
| 17 | 1-17 | 17 | 12 | DYN |
| 18 | 1-18 | 18 | 148 | DYN |
| 19 | 1-19 | 19 | 177 | DYN |
| 20 | 1-20 | 20 | 22 | DYN |
| 21 | 1-21 | 21 | 200 | STAT |
| 22 | 1-22 | 22 | 351 | DYN |
| 23 | 1-23 | 23 | 83 | DYN |
| 24 | 1-24 | 24 | 234 | DYN |
| 25 | 1-25 | 25 | 92 | DYN |
| 26 | 1-26 | 26 | 313 | DYN |
| 27 | 1-27 | 27 | 143 | DYN |
| 28 | 1-28 | 28 | 277 | DYN |
| 29 | 1-29 | 29 | 1 | DYN |
| 30 | 1-30 | 30 | 147 | DYN |
| 31 | 1-31 | 31 | 61 | STAT |
| 32 | 1-32 | 32 | 56 | DYN |
| 33 | 1-33 | 33 | 156 | DYN |
| 34 | 1-34 | 34 | 179 | DYN |
| 35 | 1-35 | 35 | 144 | DYN |
| 36 | 1-36 | 36 | 2 | STAT |
| 37 | 1-37 | 37 | 107 | DYN |
| 38 | 1-38 | 38 | 225 | DYN |
| 39 | 1-39 | 39 | 4 | DYN |
| 40 | 1-40 | 40 | 113 | DYN |
| 41 | 1-41 | 41 | 86 | DYN |
| 42 | 1-42 | 42 | 299 | DYN |
| 43 | 1-43 | 43 | 230 | DYN |
| 44 | 1-44 | 44 | 321 | DYN |
| 45 | 1-45 | 45 | 172 | DYN |
| 46 | 1-46 | 46 | 6 | STAT |
| 47 | 1-47 | 47 | 166 | DYN |
| 48 | 1-48 | 48 | 219 | DYN |
| 49 | 1-49 | 49 | 4 | DYN |
| 50 | 1-50 | 50 | 97 | DYN |

Virtual Switch 2 MAC Table

| Entry | MAC | Port | Time | Type |
|---|---|---|---|---|
| 1 | 2-1 | 1 | 334 | DYN |
| 2 | 2-2 | 2 | 190 | DYN |
| 3 | 2-3 | 3 | 92 | DYN |
| 4 | 2-4 | 4 | 19 | DYN |
| 5 | 2-5 | 5 | 296 | DYN |
| 6 | 2-6 | 6 | 138 | DYN |
| 7 | 2-7 | 7 | 134 | DYN |
| 8 | 2-8 | 8 | 201 | DYN |
| 9 | 2-9 | 9 | 39 | DYN |
| 10 | 2-10 | 10 | 244 | DYN |

Virtual Switch 3 MAC Table

| Entry | MAC | Port | Time | Type |
|---|---|---|---|---|
| 1 | 3-1 | 1 | 346 | DYN |
| 2 | 3-2 | 2 | 311 | DYN |
| 3 | 3-3 | 3 | 23 | DYN |
| 4 | 3-4 | 4 | 37 | DYN |
| 5 | 3-5 | 5 | 145 | DYN |
| 6 | 3-6 | 6 | 134 | DYN |
| 7 | 3-7 | 7 | 95 | DYN |
| 8 | 3-8 | 8 | 196 | DYN |
| 9 | 3-9 | 9 | 350 | DYN |
| 10 | 3-10 | 10 | 158 | DYN |
| 11 | 3-11 | 11 | 265 | DYN |
| 12 | 3-12 | 12 | 135 | DYN |
| 13 | 3-13 | 13 | 80 | DYN |
| 14 | 3-14 | 14 | 236 | DYN |
| 15 | 3-15 | 15 | 151 | DYN |
| 16 | 3-16 | 16 | 332 | DYN |
| 17 | 3-17 | 17 | 113 | DYN |

FIG. 5C

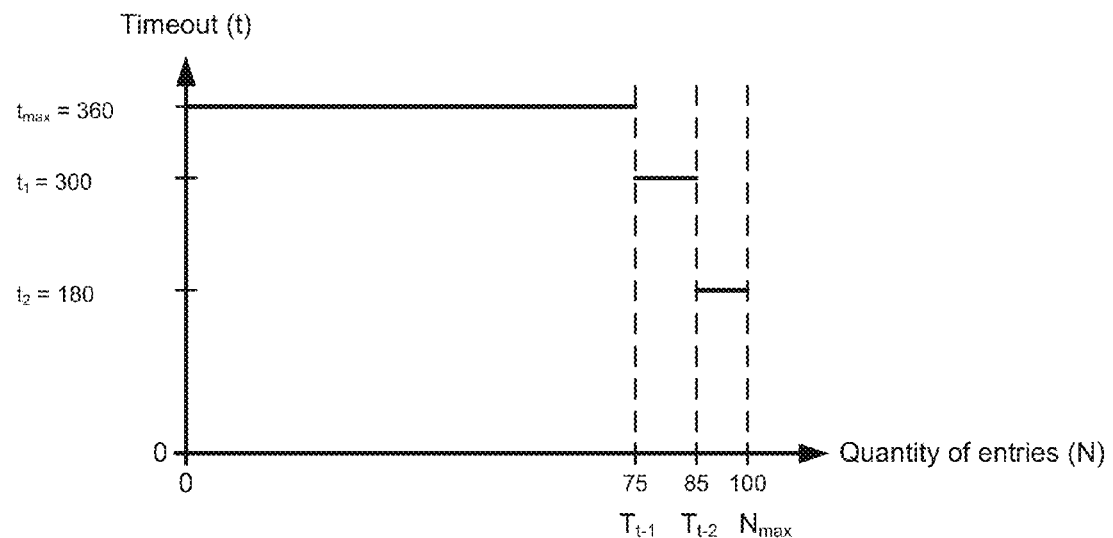
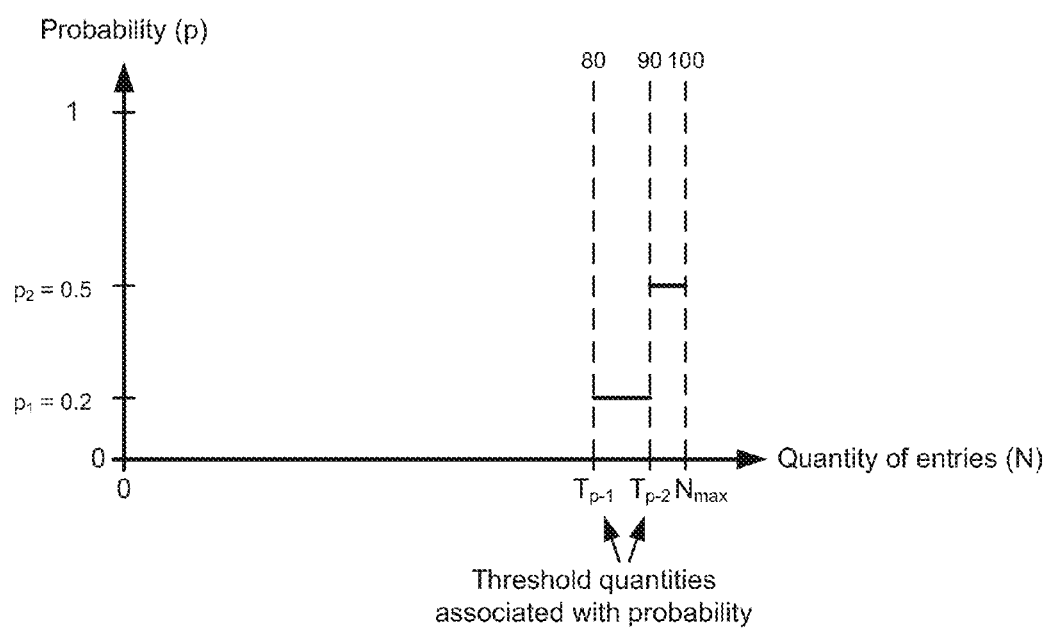
FIG. 5D

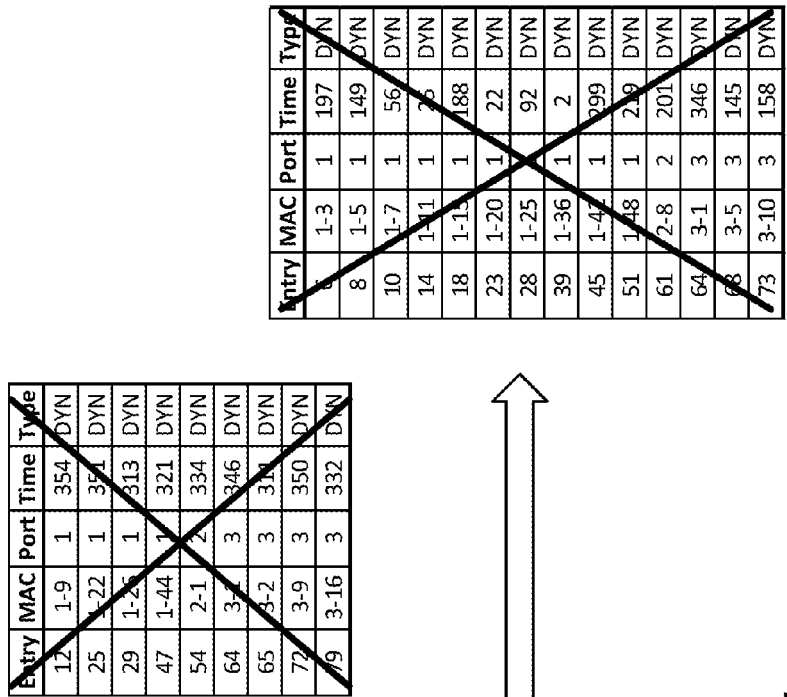

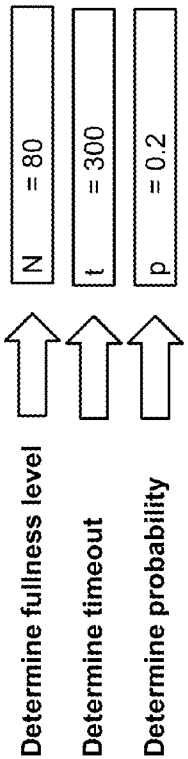

510 →

Remove MAC table entries based on timeout and random selection from a subset of the MAC table which includes all dynamic entries Determine fullness level → N = 80

Determine timeout → t = 300

Determine probability → p = 0.2

Remove entries which satisfy the accelerated timeout threshold from the subset which includes all dynamic entries Remove entries randomly selected based on probability from the subset which includes all dynamic entries

Physical switch MAC table after applying accelerated timeout and random removal to dynamic entries
(22 entries removed)

| Entry | MAC | Port | Time | Type | | Entry | MAC | Port | Time | Type | | Entry | MAC | Port | Time | Type | | Entry | MAC | Port | Time | Type |
|---|---|---|---|---|---|---|---|---|---|---|---|---|---|---|---|---|---|---|---|---|---|---|
| 1 | 1-0 | 1 | 1 | STA | | 16 | 1-19 | 1 | 177 | DYN | | 30 | 1-38 | 1 | 225 | DYN | | 44 | 2-6 | 2 | 138 | DYN |
| 2 | 2-0 | 2 | 19 | STA | | 17 | 1-21 | 1 | 200 | DYN | | 31 | 1-39 | 1 | 4 | DYN | | 45 | 2-7 | 2 | 134 | DYN |
| 3 | 3-0 | 3 | 23 | STA | | 18 | 1-23 | 1 | 83 | DYN | | 32 | 1-40 | 1 | 113 | DYN | | 46 | 2-9 | 2 | 39 | DYN |
| 4 | 1-1 | 1 | 85 | DYN | | 19 | 1-24 | 1 | 234 | DYN | | 33 | 1-41 | 1 | 86 | DYN | | 47 | 2-10 | 2 | 244 | DYN |
| 5 | 1-2 | 1 | 282 | DYN | | 20 | 1-27 | 1 | 143 | DYN | | 34 | 1-43 | 1 | 230 | DYN | | 48 | 3-3 | 3 | 23 | DYN |
| 6 | 1-4 | 1 | 188 | DYN | | 21 | 1-28 | 1 | 277 | DYN | | 35 | 1-45 | 1 | 172 | DYN | | 49 | 3-4 | 3 | 37 | DYN |
| 7 | 1-6 | 1 | 294 | DYN | | 22 | 1-29 | 1 | 1 | DYN | | 36 | 1-46 | 1 | 6 | DYN | | 50 | 3-6 | 3 | 134 | DYN |
| 8 | 1-8 | 1 | 171 | DYN | | 23 | 1-30 | 1 | 147 | DYN | | 37 | 1-47 | 1 | 166 | DYN | | 51 | 3-7 | 3 | 95 | DYN |
| 9 | 1-10 | 1 | 69 | DYN | | 24 | 1-31 | 1 | 61 | DYN | | 38 | 1-49 | 1 | 4 | DYN | | 52 | 3-8 | 3 | 196 | DYN |
| 10 | 1-12 | 1 | 13 | DYN | | 25 | 1-32 | 1 | 56 | DYN | | 39 | 1-50 | 1 | 97 | DYN | | 53 | 3-11 | 3 | 265 | DYN |
| 11 | 1-13 | 1 | 123 | DYN | | 26 | 1-33 | 1 | 156 | DYN | | 40 | 2-2 | 2 | 190 | DYN | | 54 | 3-12 | 3 | 135 | DYN |
| 12 | 1-14 | 1 | 218 | DYN | | 27 | 1-34 | 1 | 179 | DYN | | 41 | 2-3 | 2 | 92 | DYN | | 55 | 3-13 | 3 | 80 | DYN |
| 13 | 1-16 | 1 | 197 | DYN | | 28 | 1-35 | 1 | 144 | DYN | | 42 | 2-4 | 2 | 19 | DYN | | 56 | 3-14 | 3 | 236 | DYN |
| 14 | 1-17 | 1 | 12 | DYN | | 29 | 1-37 | 1 | 107 | DYN | | 43 | 2-5 | 2 | 296 | DYN | | 57 | 3-15 | 3 | 151 | DYN |
| 15 | 1-18 | 1 | 148 | DYN | | | | | | | | | | | | | | 58 | 3-17 | 3 | 113 | DYN |

Remove MAC table entries based on timeout and random selection from a subset of the MAC table which includes all dynamic entries associated with a particular "greedy" port Determine fullness level ⟹ N = 80

Determine timeout ⟹ timeout = 180

Determine probability ⟹ probability = .2

Identify a "greedy" port ⟹ port = 1

Remove entries which satisfy the accelerated timeout threshold from the subset which includes all dynamic entries associated with the greedy port

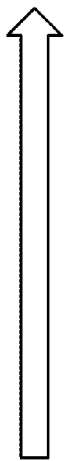

Remove entries randomly selected based on probability from the subset which includes all dynamic entries associated with the greedy port

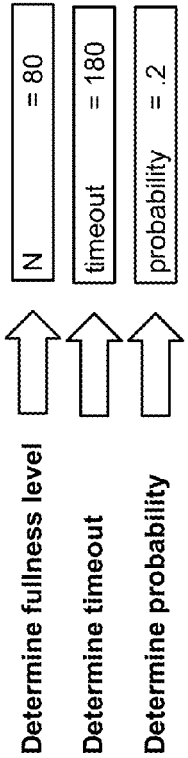

FIG. 5G

Physical switch MAC table after applying accelerated timeout and random removal to dynamic entries associated with a "greedy" port 1
(12 entries removed)

| Entry | MAC | Port | Time | Type |
|---|---|---|---|---|
| 1 | 1-0 | 1 | 1 | STA |
| 2 | 2-0 | 2 | 19 | STA |
| 3 | 3-0 | 3 | 23 | STA |
| 4 | 1-1 | 1 | 85 | DYN |
| 5 | 1-2 | 1 | 282 | DYN |
| 6 | 1-3 | 1 | 197 | DYN |
| 7 | 1-4 | 1 | 188 | DYN |
| 8 | 1-5 | 1 | 149 | DYN |
| 9 | 1-6 | 1 | 294 | DYN |
| 10 | 1-7 | 1 | 56 | DYN |
| 11 | 1-8 | 1 | 171 | DYN |
| 12 | 1-10 | 1 | 69 | DYN |
| 13 | 1-14 | 1 | 218 | DYN |
| 14 | 1-16 | 1 | 197 | DYN |
| 15 | 1-17 | 1 | 12 | DYN |
| 16 | 1-18 | 1 | 148 | DYN |
| 17 | 1-21 | 1 | 200 | DYN |

| Entry | MAC | Port | Time | Type |
|---|---|---|---|---|
| 18 | 1-23 | 1 | 83 | DYN |
| 19 | 1-24 | 1 | 234 | DYN |
| 20 | 1-25 | 1 | 92 | DYN |
| 21 | 1-26 | 1 | 313 | DYN |
| 22 | 1-27 | 1 | 143 | DYN |
| 23 | 1-28 | 1 | 277 | DYN |
| 24 | 1-29 | 1 | 1 | DYN |
| 25 | 1-30 | 1 | 147 | DYN |
| 26 | 1-32 | 1 | 56 | DYN |
| 27 | 1-33 | 1 | 156 | DYN |
| 28 | 1-34 | 1 | 179 | DYN |
| 29 | 1-35 | 1 | 144 | DYN |
| 30 | 1-36 | 1 | 2 | DYN |
| 31 | 1-37 | 1 | 107 | DYN |
| 32 | 1-39 | 1 | 4 | DYN |
| 33 | 1-40 | 1 | 113 | DYN |
| 34 | 1-41 | 1 | 86 | DYN |

| Entry | MAC | Port | Time | Type |
|---|---|---|---|---|
| 35 | 1-42 | 1 | 299 | DYN |
| 36 | 1-43 | 1 | 230 | DYN |
| 37 | 1-46 | 1 | 6 | DYN |
| 38 | 1-47 | 1 | 166 | DYN |
| 39 | 1-48 | 1 | 219 | DYN |
| 40 | 1-49 | 1 | 4 | DYN |
| 41 | 1-50 | 1 | 97 | DYN |
| 42 | 2-1 | 2 | 334 | DYN |
| 43 | 2-2 | 2 | 190 | DYN |
| 44 | 2-3 | 2 | 92 | DYN |
| 45 | 2-4 | 2 | 19 | DYN |
| 46 | 2-5 | 2 | 296 | DYN |
| 47 | 2-6 | 2 | 138 | DYN |
| 48 | 2-7 | 2 | 134 | DYN |
| 49 | 2-8 | 2 | 201 | DYN |
| 50 | 2-9 | 2 | 39 | DYN |
| 51 | 2-10 | 2 | 244 | DYN |

| Entry | MAC | Port | Time | Type |
|---|---|---|---|---|
| 52 | 3-1 | 3 | 346 | DYN |
| 53 | 3-2 | 3 | 311 | DYN |
| 54 | 3-3 | 3 | 23 | DYN |
| 55 | 3-4 | 3 | 37 | DYN |
| 56 | 3-5 | 3 | 145 | DYN |
| 57 | 3-6 | 3 | 134 | DYN |
| 58 | 3-7 | 3 | 95 | DYN |
| 59 | 3-8 | 3 | 196 | DYN |
| 60 | 3-9 | 3 | 350 | DYN |
| 61 | 3-10 | 3 | 158 | DYN |
| 62 | 3-11 | 3 | 265 | DYN |
| 63 | 3-12 | 3 | 135 | DYN |
| 64 | 3-13 | 3 | 80 | DYN |
| 65 | 3-14 | 3 | 236 | DYN |
| 66 | 3-15 | 3 | 151 | DYN |
| 67 | 3-16 | 3 | 332 | DYN |
| 68 | 3-17 | 3 | 113 | DYN |

FIG. 5H

DYNAMIC REMOVAL OF MAC TABLE ENTRIES BASED ON A MAC TABLE FULLNESS LEVEL

BACKGROUND

In computer networking, a switch may receive data, from a first network interface controller (NIC) via a first port, and may forward the data to one or more other NICs. The switch may extract, from the data, a media access control (MAC) address associated with the first NIC and may store, as an entry in a MAC table, the extracted MAC address and an identifier associated with the first port. The switch may direct subsequent data to the first NIC via the MAC address and port identified in the MAC table entry associated with the first NIC.

BRIEF DESCRIPTION OF THE DRAWINGS

FIG. 3 is a diagram of example components of one or more devices of FIG. 2;

FIG. 4 is a flow chart of an example process for dynamically removing MAC table entries based on a MAC table fullness level; and FIGS. 5A-5H are diagrams of example implementations relating to the example process shown in FIG. 4.

DETAILED DESCRIPTION OF PREFERRED EMBODIMENTS

Figure 1:
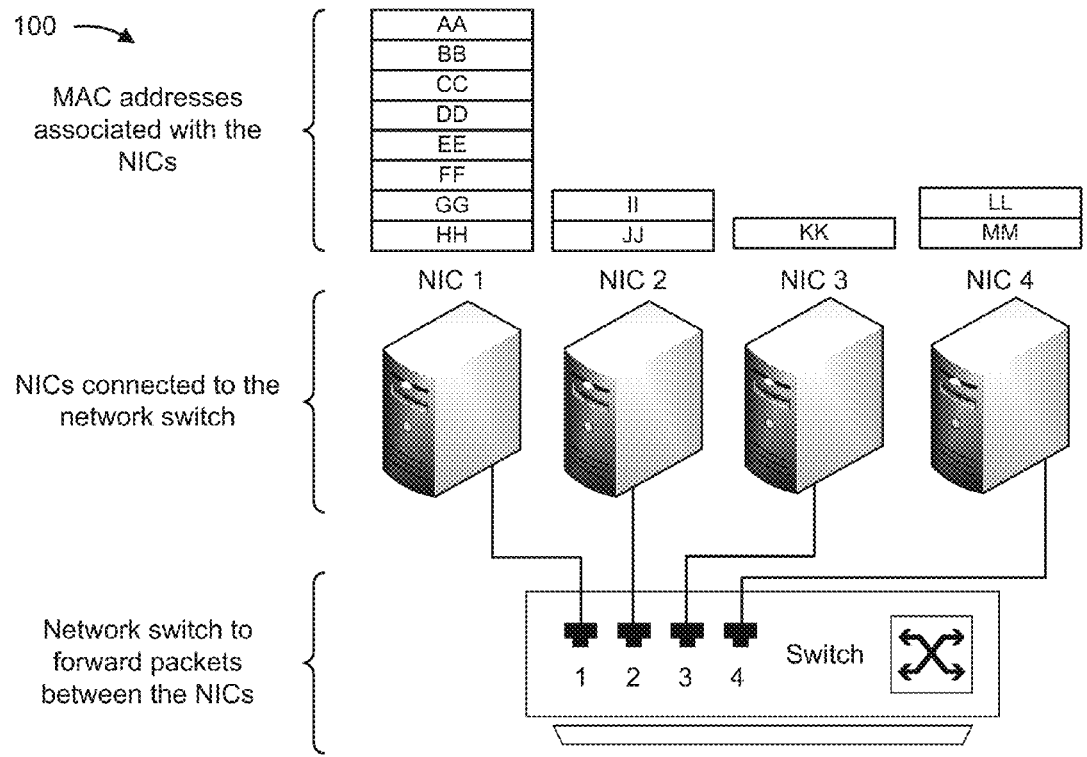
FIG. 1 is a diagram of an overview of an example implementation described herein.

The following detailed description of example implementations refers to the accompanying drawings. The same reference numbers in different drawings may identify the same or similar elements.

A network switch facilitates efficient, directed communication between the switch's ports by identifying, for data received by the switch, a MAC address associated with a sending device and a port via which the data was received and generating a MAC table entry which associates the MAC address with the port. In this way, if the switch receives data which identifies, as a recipient, a MAC address stored in the MAC table, the switch may forward the data to the port identified in the MAC table entry associated with that MAC address, rather than broadcasting the data to determine which port is connected to the device associated with that MAC address.

The switch maintains the MAC table in memory (e.g., binary or ternary content-addressable memory). Thus, the capacity of the MAC table is finite. If the MAC table becomes full, the switch may no longer associate additional MAC addresses with ports. If the switch receives data for a MAC address which is not identified in the MAC table, the switch may be unable to efficiently forward the data and may instead broadcast the data to multiple devices via multiple ports. Broadcasting data in this way may congest a network associated with the switch and may disrupt and/or compromise the security of data forwarded by the switch (e.g., by allowing other devices connected to the switch to receive the broadcast data). To avoid filling up the MAC table completely, the switch may implement a timeout condition, where if the switch has not forwarded data from a particular MAC address within a particular timeout period, the switch may remove the MAC table entry associated with that particular MAC address. However, the MAC table may still become full despite removing entries based on a timeout condition if the timeout period is static. In implementations described herein, the switch may adjust the timeout period based the MAC table's fullness level (e.g., to accelerate the time-out of entries based on an increased fullness level).

Alternatively, or additionally, implementations described herein may prevent the MAC table from becoming full by randomly removing entries. For example, in a cloud computing environment, host devices may connect to the switch via corresponding NICs associated with corresponding MAC addresses. Further, each host device may implement one or more virtual switches by which virtual NICs, associated with corresponding MAC addresses, also connect to the switch. Thus, the switch may maintain a MAC table having entries, for both physical NICs and virtual NICs, associated with times that fall within a particular timeout period. To avoid filling the MAC table completely, the switch may randomly remove MAC table entries. The switch may further determine a probability associated with removing MAC table entries based on the MAC table's fullness level (e.g., to accelerate the random removal of entries based on an increased fullness level).

A switch that removes entries from its MAC table based by accelerating an expiration and/or random removal of entries based on a fullness level may retain space for creating new entries. The switch, operating in this manner, may further limit an abuse of network resources by removing a quantity of MAC table entries, associated with an entity, in proportion to a total quantity of MAC table entries associated with the entity. Additionally, or alternatively, the switch may separately regulate broadcast data to limit an impact thereof on data sent between devices having MAC table entries. In this way, an entity may experience performance degradation associated with broadcasting data in proportion to the entity's consumption.

FIG. 1 is a diagram of an overview of an example implementation 100 described herein. Assume, for example implementation 100, that a first NIC (NIC 1) communicates data associated with eight MAC addresses (AA, BB, CC, DD, EE, FF, GG, and HH) via a first switch port; a second NIC (NIC 2) communicates data associated with two MAC addresses (II and JJ) via a second switch port; a third NIC (NIC 3) communicates data associated with one MAC address (KK) via a third switch port; and a fourth NIC (NIC 4) communicates data associated with two MAC addresses (LL and MM) via a fourth switch port. Assume further that a MAC table, associated with the switch, contains entries associating MAC addresses to port numbers and identifies an age associated with each entry. Assume further that the MAC table has a capacity of ten entries and that, at a particular time, all ten entries are being used to identify MAC addresses AA, BB, CC, DD, EE, II, JJ, KK, LL, and MM. In this situation, MAC addresses FF, GG, and HH are not identified in the MAC table, and the switch may broadcast data sent to those MAC addresses to multiple NICs in order to reach the first NIC associated with those MAC addresses.

Assume that the switch continually or periodically removes MAC table entries whose age satisfies a timeout threshold (e.g., removes entries that fall within a normal timeout range). Assume further that, based on determining that the fullness level of the MAC table satisfies a first fullness threshold, the switch modifies the timeout threshold to remove entries whose age satisfies the modified timeout threshold (e.g., to remove entries whose age falls within a fast timeout range in addition to entries whose age falls within the normal timeout range). Assume further that, based on determining that the fullness level of the MAC table satisfies a second fullness threshold, the switch determines, based on the fullness level, a probability associated with randomly selecting entries for removal, and the switch removes entries randomly selected based on the probability.

Assume that, at a particular time, the switch determines that the fullness level of the MAC table satisfies both the first and second fullness thresholds. Assume that, based on determining that the fullness level satisfies the first fullness threshold, the switch determines that ages associated with a first group of entries (e.g., the entries identifying MAC addresses AA, II, JJ, and LL) satisfies the modified timeout threshold (e.g., falls within the fast timeout range or the normal timeout range), and, based on this determination, the switch removes the first group of entries from the MAC table. Assume further that, based on determining that the fullness level satisfies the second fullness threshold, the switch determines a probability (e.g., 20%) and randomly selects, based on the probability (e.g., randomly selects 20% of the entries) a second group of entries (e.g., the entries identifying MAC addresses CC and EE) and removes the second group of entries from the MAC table. In this way, the switch may alleviate the load on the MAC table by more aggressively removing older entries as well as randomly removing entries.

Figure 2:
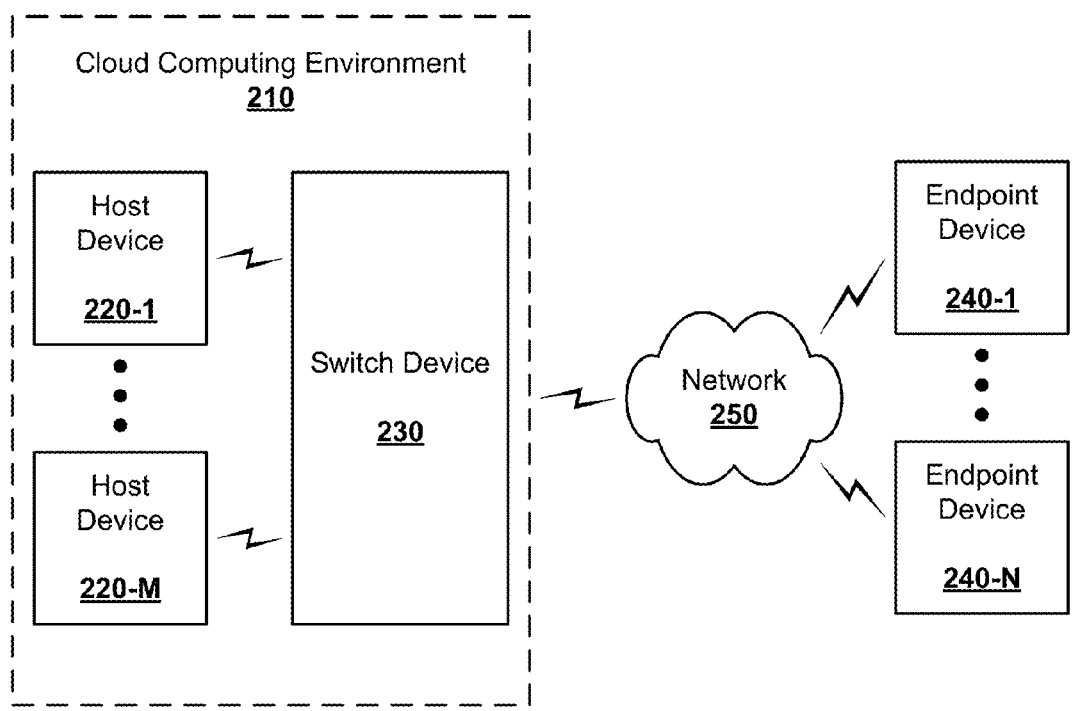
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a cloud computing environment 210; a group of host devices 220-1, . . . , 220-M (M≥1) (hereinafter referred to collectively as "host device 220" and individually as "host device 220"); a switch device 230; a group of endpoint devices 240-1, . . . , 240-N (N≥1) (hereinafter referred to collectively as "endpoint devices 240" and individually as "endpoint device 240"); and/or a network 250. Devices of environment 200 may interconnect via wired connections, wireless connections, or a combination of wired and wireless connections.

Cloud computing environment 210 may include an environment that delivers computing as a service, whereby shared resources, services, or the like may be provided to endpoints 240. Cloud computing environment 210 may provide computation, software, data access, storage, and/or other services that do not require end-user knowledge of a physical location and configuration of a system and/or a device that delivers the services. As shown, cloud computing environment 210 may include host device 220 and switch device 230.

Host device 220 may include one or more devices capable of storing, processing, and/or routing information, such as a server device. In some implementations, host device 220 may include a communication interface that allows host device 220 to receive information from and/or transmit information to other devices in environment 200. For example, host device 220 may communicate with switch device 230 and/or with endpoints 240 via switch device 230. Host device 220 may implement one or more virtual machines and/or one or more virtual switches, which may communicate, through host device 220, with switch device 230 and/or with endpoint 240 via switch device 230.

Switch device 230 may include one or more devices (e.g., one or more traffic transfer devices) capable of processing and/or transferring traffic between endpoint devices 240. For example, switch device 230 may include a firewall, a router, a gateway, a switch, a bridge, a reverse proxy, a server (e.g., a proxy server), a security device, an intrusion detection device, a load balancer, or a similar device. Switch device 230 may communicate with host device 220, a virtual machine/switch operating on host device 220, and/or endpoint 240.

Endpoint device 240 may include one or more devices capable of receiving and/or providing information over a network (e.g., network 250), and/or capable of generating, storing, and/or processing information received and/or provided over the network. For example, endpoint device 240 may include a computing device, such as a laptop computer, a tablet computer, a handheld computer, a desktop computer, a mobile phone (e.g., a smart phone, a radiotelephone, etc.), a network device (e.g., a router, a gateway, a firewall, a hub, a bridge, etc.), or a similar device. Endpoint device 240 may act as an endpoint (e.g., a source and/or a destination) for a communication with another device. For example, a first endpoint device 240 may provide information to a second endpoint device 240, to a host device 220, and/or to a virtual machine operating on a host device 220 (e.g., via switch device 230, a virtual switch operating on host device 220, and/or network 250).

Network 250 may include one or more wired and/or wireless networks. For example, network 250 may include a cellular network (e.g., a long term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to host device 220, switch device 230, and/or endpoint device 240. In some implementations, host device 220, switch device 230, and/or endpoint device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for dynamically removing MAC table entries based on a MAC table fullness level. In some implementations, one or more process blocks of FIG. 4 may be performed by switch device 230. Additionally, or alternatively, one or more process blocks of FIG. 4 may be performed by another device or a group of devices separate from or including switch device 230, such as host device 220 and/or endpoint device 240. For example, one or more process blocks of FIG. 4 may be performed by host device 220 implementing a virtual switch.

As shown in FIG. 4, process 400 may include determining a fullness level associated with a MAC table (block 410). For example, switch device 230 may continuously, periodically, and/or occasionally determine an absolute quantity and/or a relative quantity (e.g., relative to a capacity and/or one or more particular fullness thresholds) of entries maintained in a MAC table (e.g., provided in a ternary content-addressable memory (TCAM)). In some implementations, switch device 230 may divide the MAC table into subsets and may determine a fullness level for each subset. For example, switch device 230 may identify a subset associated with a particular port, network interface, virtual switch, virtual LAN, or the like and may determine a fullness level associated with that subset. By determining the fullness level, switch device 230 may determine whether and how to remove entries from the MAC table to prevent the MAC table from becoming full. By determining separate fullness levels for subsets of the MAC table, switch device 230 may implement different removal policies associated with each subset (e.g., based on contractual obligations associated with users of the subset, a priority level associated with the subset, or the like).

Switch device 230 may represent the fullness level as, e.g., a quantity, ratio, percentage, range, Boolean value, status identifier, or the like. For example, if the MAC table stores 'x' entries out of a possible capacity of 'y' entries, the fullness level may be represented as x, x/y, and/or a quantity/identifier 'n' associated with x and/or x/y. Alternatively, or additionally, the fullness level may be based on an absolute and/or relative quantity of memory associated with the MAC table. For example, if the MAC table consumes a quantity of memory 'x' out of a possible memory capacity 'y,' the fullness level may be represented as x, x/y, and/or a quantity/identifier 'n' associated with x and/or x/y. In this way, switch device 230 may identify a fullness level associated with the MAC table to time out and/or randomly remove entries from the MAC table based on the fullness level.

As further shown in FIG. 4, process 400 may include determining a timeout, associated with accelerating expiration of MAC table entries, based on the fullness level (block 420). For example, switch device 230 may continuously, periodically, or occasionally (e.g., based on determining that the fullness level satisfies one or more thresholds) determine the timeout. Switch device 230 may decrease the timeout based on an increase in the fullness level and/or may increase the timeout based on a decrease in the fullness level. In some implementations, switch device 230 may divide the MAC table into subsets and may determine a timeout for each subset. For example, switch device 230 may identify a subset associated with a particular port, network interface, virtual switch, virtual LAN, or the like and may determine a timeout associated with that subset based on the fullness level of the subset. By determining the timeout, switch device 230 may determine whether and how to accelerate the expiration of MAC table entries to prevent the MAC table from becoming full. By determining separate timeouts for subsets of the MAC table, switch device 230 may implement different timeout policies associated with each subset (e.g., based on contractual obligations associated with users of the subset, a priority level associated with the subset, or the like). In some implementations, switch device 230 may determine a timeout parameter, with respect to a particular subset of the MAC table, based on a fullness level, a timeout, or another variable parameter of a different subset of the MAC table.

The timeout may be represented as an absolute time (e.g., a quantity of clock cycles, a time, a date, a month, a year, a day, a day of the week, a day of the month, or the like) and/or a relative time (e.g., a quantity of clock cycles, seconds, minutes, hours, days, weeks, months, years, or the like) determined by switch device 230 based on the fullness level (e.g., by evaluating a mathematical expression, consulting a list or table of values, or the like). For example, the timeout may be expressed, in absolute terms, as an expiration date and/or time or, in relative terms, as a time-to-live. In this way, switch device 230 may accelerate the timing out of a MAC table entry as the MAC table, or a portion thereof, becomes full.

As further shown in FIG. 4, process 400 may include determining a probability, associated with randomly removing MAC table entries, based on the fullness level (block 430). For example, switch device 230 may continuously, periodically, or occasionally (e.g., based on determining that the fullness level satisfies one or more thresholds) determine the probability. Switch device 230 may increase the probability based on an increase in the fullness level and/or may decrease the probability based on a decrease in the fullness level. In some implementations, switch device 230 may divide the MAC table into subsets and may determine a probability for each subset. For example, switch device may identify a subset associated with a particular port, network interface, virtual switch, virtual LAN, or the like and may determine a probability associated with that subset based on the fullness level of the subset. By determining the probability, switch device 230 may determine whether and how to remove entries from the MAC table to prevent the MAC table from becoming full. By determining separate probabilities for subsets of the MAC table, switch device 230 may implement different removal policies associated with each subset (e.g., based on contractual obligations associated with users of the subset, a priority level associated with the subset, or the like). In some implementations, switch device 230 may determine a timeout parameter, with respect to a particular subset of the MAC table, based on a fullness level, a timeout, or another variable parameter of a different subset of the MAC table.

The probability may be represented as a ratio, percentage, quantity, or the like determined by switch device 230 (e.g., by evaluating a mathematical expression, consulting a list/table of values, or the like). Alternatively, or additionally, switch device 230 may generate a list identifying a particular quantity of randomly selected MAC table entries, the particular quantity being a proportion, equal to the probability, of the total quantity of entries and/or capacity of the MAC table. In this way, switch device 230 may increase a probability associated with randomly removing a MAC table entry as the MAC table, or a portion thereof, becomes full.

As further shown in FIG. 4, process 400 may include removing entries, from the MAC table, based on the timeout and/or the probability (block 440). For example, switch device 230 may continuously, periodically, or occasionally (e.g., based on satisfying a threshold associated with, e.g., a fullness level and/or a time) identify and remove entries from the MAC table based on the timeout and/or based on the probability. In some implementations, switch device 230 may sequentially remove entries based on the timeout and/or probability. Alternatively, or additionally, switch device 230 may simultaneously remove entries based on the timeout and/or probability. Alternatively, or additionally, switch device 230 may selectively remove entries based on the timeout and/or based on the probability (e.g., based on satisfying, and/or not satisfying, one or more thresholds associated with removing entries based on the timeout and/or probability). Switch device 230 may remove entries by removing the contents of the entries and/or mark memory locations associated with the entries as being available for creating new entries.

Switch device 230 may remove entries based on the timeout by determining that times (e.g., time and/or date stamps) associated with creating and/or updating the entries satisfy the timeout (or a group of timeouts) associated with the entries. For example, switch device 230 may compare times associated with entries to a present time and/or to the timeout time. Alternatively, or additionally, switch device 230 may remove entries based on determining that times, associated with the entries, fall within or outside of a time range associated with the timeout and/or a present time.

Switch device 230 may remove entries based on the probability by randomly selecting entries to be removed based on a likelihood of selection determined by the probability. Alternatively, or additionally, switch device 230 may determine a quantity of entries, based on the probability, and may randomly remove the quantity of entries from the MAC table.

Switch device 230 may remove entries associated with the entire MAC table or a particular subset thereof. For example, switch device 230 may remove entries associated with a particular port, network interface, virtual switch, virtual LAN, or the like. Additionally, or alternatively, switch device 230 may remove entries from a particular subset based on a quantity of entries associated with the subset (e.g., based on the quantity satisfying a threshold). For example, switch device 230 may remove entries from a subset containing a quantity of entries, associated with a particular virtual LAN, which exceeds a threshold (e.g., based on a capacity of the table, a quantity of other entries in the table, a contracted-for-quantity of entries, or the like). Alternatively, or additionally, switch device 230 may remove entries from a subset of entries associated with a priority level which satisfies a threshold (e.g., to remove entries associated with lower priority levels relative to other entries). In this way, switch device 230 may reduce a fullness associated with the MAC table by progressively implementing a random removal and/or accelerated timeout process based on the fullness level. By repeating this process continuously, intermittently, and/or periodically, switch device 230 may prevent the MAC table from becoming full.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5H are diagrams of example implementations 500-520 relating to example process 400 shown in FIG. 4. FIGS. 5A-5H show examples of dynamically removing MAC table entries based on a MAC table fullness level.

Figure 5A:
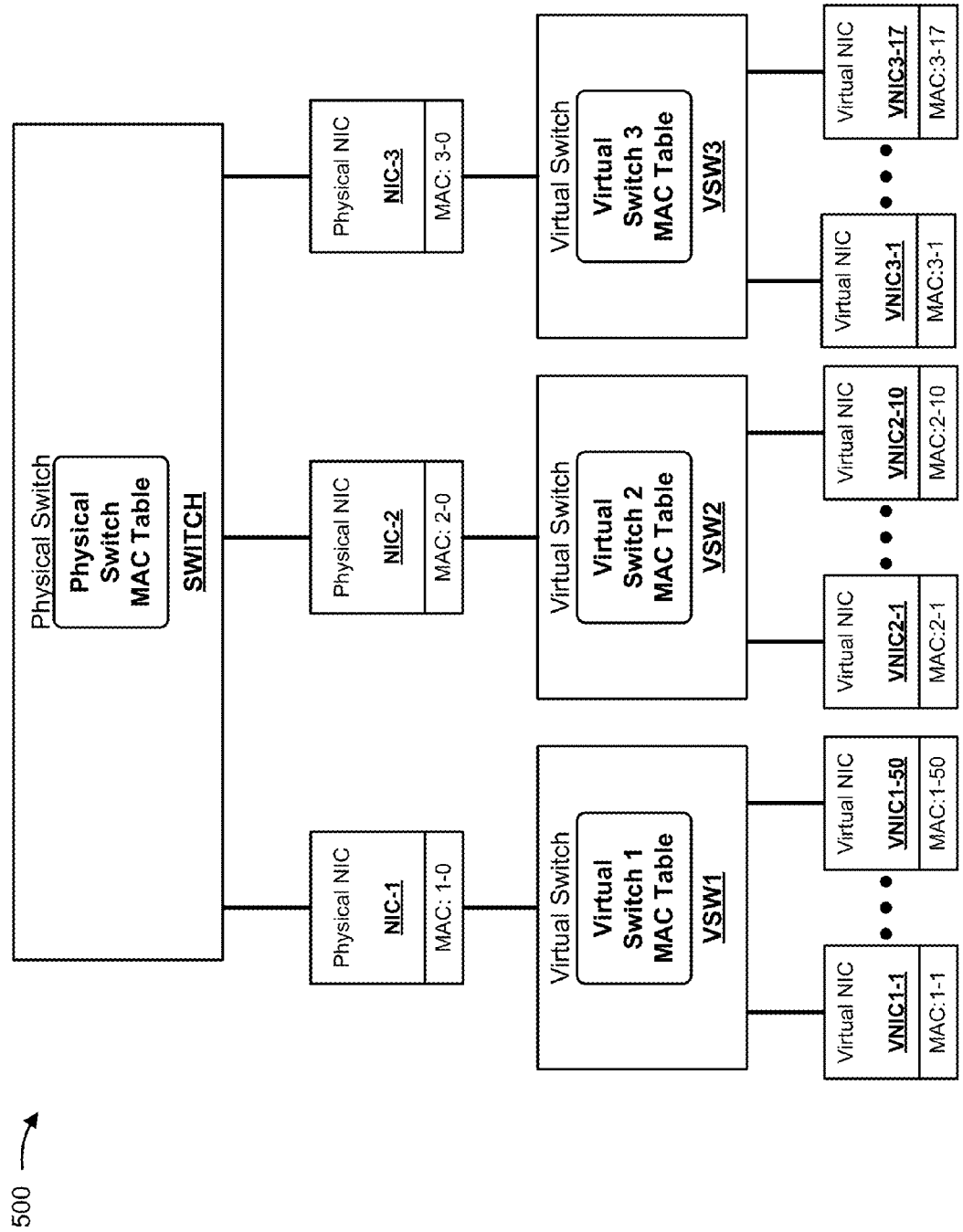

As shown in FIG. 5A, assume, for example implementation 500, that a physical switch (e.g., switch device 230) is connected to a first physical NIC (NIC-1) associated with a first MAC address 1-0) via a first port of the physical switch; a second physical NIC (NIC-2) associated with a second MAC address 2-0) via a second port of the physical switch; and a third physical NIC (NIC-3) associated with a third MAC address 3-0) via a third port of the physical switch. Assume further that each physical NIC (NIC-1, NIC2, NIC-3) is further connected to a corresponding virtual switch (VSW1, VSW2, VSW3) (e.g., via an associated host device 220). Assume further that the first virtual switch (VSW1) is connected to fifty virtual NICs (VNIC1-1 to VNIC1-50) associated with a corresponding fifty MAC addresses (1-1 to 1-50); the second virtual switch (VSW2) is connected to a ten virtual NICs (VNIC2-1 to VNIC2-10) associated with a corresponding ten MAC addresses (2-1 to 2-10); and the third virtual switch (VSW3) is connected to seventeen virtual NICs (VNIC3-1 to VNIC3-17) associated with a corresponding seventeen MAC addresses (3-1 to 3-17). Assume further that the physical switch maintains, in a physical switch MAC table, entries associated with physical and/or virtual NICs which are connected to the physical switch and that each of the virtual switches (VSW1, VSW2, and VSW3) maintain, in respective virtual switch MAC tables, entries associated with virtual NICs which are connected to the respective virtual switch.

As shown in FIG. 5B, assume, for example implementation 500, that the physical switch has received data from each of the physical and/or virtual NICs described above within a particular maximum timeout time (as described with respect to FIG. 5C). Assume further that, based on receiving data from physical and/or virtual NICs within the maximum timeout period, the physical switch has created and/or updated entries, in the physical switch MAC table, identifying a MAC address, port, time (expressed as an age in seconds), and type (static or dynamic) associated with each of the physical and/or virtual NICs described above (for a total of eighty entries). Assume further that the entries associated with the physical NICs (NIC1/MAC 1-0; NIC2/MAC 2-0; and NIC3/MAC 3-0) are identified as being "static" entries (i.e., not expected to dynamically associate/disassociate with the physical switch). Assume further that the entries associated with all the virtual NICs are, conversely, identified as being "dynamic."

As shown in FIG. 5C, assume, for example implementation 500, that each virtual switch has likewise received data from each of the virtual NICs associated with the virtual switch within a particular maximum timeout time (as described with respect to FIG. 5C). Assume further that, based on receiving data from the virtual NICs within the maximum timeout period, the virtual switch has created and/or updated entries, in the virtual switch MAC table, identifying a MAC address, virtual port, time, and type associated with each of the virtual NICs described above. Assume further that each entry is identified as being "dynamic" (e.g., capable of dynamically associating/disassociating with the physical switch).

As shown in FIG. 5D, assume, for example implementation 500, that the physical switch determines a timeout time (t) as a function of a quantity of entries (N) in the physical switch's MAC table. Assume further that the timeout time is 360 seconds for between 0 and 74 entries, 300 seconds for between 75 and 84 entries, and 180 seconds for between 85 entries and the physical switch's MAC table capacity of 100 entries. Assume further that the physical switch determines a probability (p) as a function of a quantity of entries (N) in the physical switch's MAC table. Assume further that the probability is 0 for between 0 and 79 entries, 0.2 for between 80 and 89 entries, and 0.5 for between 90 entries and the physical switch's MAC table capacity of 100 entries.

As shown in FIG. 5E, assume, for example implementation 510, that the physical switch dynamically removes MAC table entries based on the timeout and random probabilistic selection from a subset of the MAC table which includes all entries identified as being of the "dynamic" type. Assume further that the physical switch determines a fullness level N=80, the quantity of entries contained in the physical switch's MAC table. Assume further that, based on the fullness level, the physical switch determines that the timeout t=300 seconds and the probability p=0.2. Assume that, based on timeout t=300 seconds, the physical switch identifies and removes all dynamic entries having a timeout greater than or equal to 300 seconds. Assume further that, based on probability p=0.2, the physical switch randomly selects 20% of the entries (or randomly selects entries based on a 20% chance of being selected) and removes the randomly selected entries. In this way, the physical switch may apply the timeout and random removal to all dynamic entries.

As shown in FIG. 5F, assume, for example implementation 510, that after accelerating the timeout of all dynamic entries and randomly removing some dynamic entries, the physical switch's MAC table contains 58 entries, 22 fewer than before the accelerated timeout and random removal.

As shown in FIG. 5G, assume, for example implementation 520, that the physical switch dynamically removes MAC table entries based on the timeout and random probabilistic selection from a subset of the MAC table which includes all dynamic entries identified as being associated with a particular "greedy" port (e.g., a port associated with a quantity of MAC table entries which satisfies a threshold associated with being identified as "greedy"). Assume further that, as in example implementation 510, the physical switch determines the fullness level N=80, the timeout t=300 seconds, and the probability p=0.2. Assume further that the physical switch identifies port 1 as a "greedy" port based on a quantity of entries associated with port 1. Assume further that, based on timeout t=300 seconds, the physical switch identifies and removes all dynamic entries associated with port 1 having a timeout greater than or equal to 300 seconds. Assume further that, based on probability p=0.2, the physical switch randomly selects 20% of the entries associated with port 1 (or randomly selects entries associated with port 1 based on a 20% chance of being selected) and removes the randomly selected entries. In this way, the physical switch may apply the timeout and random removal to only dynamic entries associated with a particular greedy port.

As shown in FIG. 5H, assume, for example implementation 520, that after accelerating the timeout of all dynamic entries associated with greedy port 1 and randomly removing some dynamic entries associated with greedy port 1, the physical switch's MAC table contains 68 entries, 12 fewer than before the accelerated timeout and random removal.

As indicated above, FIGS. 5A-5H are provided merely as examples. Other examples are possible and may differ from what was described with regard to FIGS. 5A-5H.

Implementations described herein may assist a network operator in preventing a switch's MAC table from becoming full by determining a timeout time and/or probability based on a fullness level of the MAC table and removing entries from the MAC table based on the timeout time and/or probability.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising: a memory to store:
   a data structure containing a quantity of entries, each entry, of the quantity of entries, identifying:
   an address, a port associated with receiving data from the address, and
   a time associated with receiving data from the address via the port, and the data structure having a capacity; and
   one or more processors to: determine whether a fullness level of the data structure satisfies a first fullness threshold, the fullness level being determined continuously or periodically by the one or more processors, and the first fullness threshold being less than the capacity; determine a timeout threshold based on the fullness level and when the fullness level satisfies the first fullness threshold, the timeout threshold being decreased based on an increase in the fullness level, and the timeout threshold being increased based on a decrease in the fullness level; remove a first quantity of entries, of the quantity of entries, from the data structure based on determining that each entry, of the first quantity of entries, identifies a time that satisfies the timeout threshold; determine a probability when the fullness level satisfies a second fullness threshold that is different than the first fullness threshold; randomly select, based on the probability and based on determining that the fullness level satisfies the second fullness threshold, a second quantity of entries from the quantity of entries; remove the second quantity of entries from the data structure; receive, from one or more other devices and via a network, data to be forwarded to a particular address; determine that the data is associated with a particular entry in the data structure, the particular entry identifying the particular address and a particular port associated with the particular address; and forward the data to the particular port.

2. The device of claim 1, where each entry, of the quantity of entries contained in the data structure, further identifies a type associated with the address, and the one or more processors are further to: identify a third quantity of entries, in the data structure, that identifies a particular type and the time that satisfies the timeout threshold; and remove the third quantity of entries, from the data structure, that identifies the particular type and the time that satisfies the timeout threshold.

3. The device of claim 1, where the one or more processors are further to: identify a third quantity of entries, in the data structure, that identifies a particular group of ports and the time that satisfies the timeout threshold; and remove the third quantity of entries, from the data structure, that identifies the particular group of ports and the time that satisfies the timeout threshold.

4. The device of claim 1, where the one or more processors are further to: determine a schedule; and determine, according to the schedule, whether the fullness level of the data structure satisfies the first fullness threshold.

5. The device of claim 1, where the device is a network switch and the address associated with each entry, of the quantity of entries, is a media access control address.

6. The device of claim 1, where the one or more processors are further to: determine whether the fullness level satisfies a third fullness threshold, the third fullness threshold being different than the first fullness threshold and the second fullness threshold; set the timeout threshold to a first timeout threshold when the fullness level satisfies the third fullness threshold; set the timeout threshold to a second timeout threshold when the fullness level satisfies the first fullness threshold but does not satisfy the third fullness threshold; and set the timeout threshold to a third timeout threshold when the fullness level satisfies neither the first fullness threshold nor the third fullness threshold, the first timeout threshold, the second timeout threshold, and the third timeout threshold being different from each other.

7. The device of claim 1, where the one or more processors are further to: increase the probability based on an increase in the fullness level; and decrease the probability based on a decrease in the fullness level.

8. A non-transitory computer-readable medium storing instructions, the instructions comprising: one or more instructions that, when executed by one or more processors, cause the one or more processors to: determine a fullness level associated with a data structure containing a plurality of entries relating to ports and addresses for forwarding data, the fullness level being determined continuously or periodically; determine a timeout threshold based on the fullness level and when the fullness level satisfies a first fullness threshold, the timeout threshold being decreased based on an increase in the fullness level, and
 the timeout threshold being increased based on a decrease in the fullness level;
 remove a first quantity of entries, of the plurality of entries, from the data structure based on determining that each entry, of the first quantity of entries, identifies a time that satisfies the timeout threshold; determine, based on the fullness level, a probability of removal when the fullness level satisfies a second fullness threshold that is different than the first fullness threshold, the probability of removal being increased based on an increase in the fullness level, and the probability of removal being decreased based on a decrease in the fullness level;
 randomly select, based on the probability of removal and based on determining that the fullness level satisfies the second fullness threshold, a second quantity of entries from the plurality of entries contained in the data structure remove the second quantity of entries from the data structure; receive, from one or more other devices and via a network, data to be forwarded to a particular address; determine that the data is associated with a particular entry in the data structure, the particular entry identifying the particular address and a particular port associated with the particular address; and
 forward the data to the particular port.

9. The non-transitory computer-readable medium of claim 8, where the one or more instructions, when executed by the one or more processors, further cause the one or more processors to: determine an age threshold based on the fullness level; identify a third quantity of entries from the plurality of entries contained in the data structure, the third quantity of entries being identified based on times, associated with the third quantity of entries, satisfying the age threshold; and remove the third quantity of entries from the data structure.

10. The non-transitory computer-readable medium of claim 8, where the one or more instructions, when executed by the one or more processors, further cause the one or more processors to: determine whether a third quantity of entries, contained in the data structure and relating to the particular port, satisfies a particular threshold; and when the third quantity of entries satisfies the particular threshold: determine, based on the fullness level, another probability of removal, the other probability of removal being different from the probability of removal; randomly select, from the plurality of entries contained in the data structure and not included in the third quantity of entries, a fourth quantity of entries based on the probability of removal; and randomly select, from the plurality of entries contained in the data structure and included in the third quantity of entries, a fifth quantity of entries based on the other probability of removal, the second quantity of entries including the fourth quantity of entries and the fifth quantity of entries.

11. The non-transitory computer-readable medium of claim 8, where the one or more instructions, when executed by the one or more processors, further cause the one or more processors to: determine, a schedule; and determine, according to the schedule, whether the fullness level of the data structure satisfies the first fullness threshold.

12. The non-transitory computer-readable medium of claim 8, where the one or more processors, are provided in a network switch.

13. The non-transitory computer-readable medium of claim 8, where the data structure is a media access control table stored in a content-addressable memory.

14. The non-transitory computer-readable medium of claim 8, where the one or more instructions, when executed by the one or more processors, further cause the one or more processors to: determine whether a third quantity of entries, contained in the data structure and associated with a particular virtual network, satisfies a third fullness threshold; and when the third quantity of entries satisfies the third fullness threshold: randomly select, from the plurality of entries contained in the data structure and included in the third quantity of entries, the second quantity of entries based on the probability of removal.

15. A method, comprising: storing, by a device, a data structure containing entries and times associated with the entries; determining, by the device, a fullness level associated with the data structure, the fullness level being determined continuously or periodically by device; determining, by the device, an expiration threshold based on the fullness level and when the fullness level satisfies a first fullness threshold; the expiration threshold being decreased based on an increase in the fullness level, and the expiration threshold being increased based on a decrease in the fullness level; identifying, by the device, a first quantity of entries, of the entries in the data structure, based on times associated with the first quantity of entries satisfying the expiration threshold; removing, by the device, the first quantity of entries from the data structure; determining, by the device, a probability when the fullness level satisfies a second fullness threshold that is different than the first fullness threshold; randomly selecting, by the device, based on the probability, and based on determining that the fullness level satisfies the second fullness threshold, a second quantity of entries of the entries in the data structure; removing, by the device, the second quantity of entries from the data structure; receiving, by the device and from one or more other devices, via a network, data to be forwarded to a particular address; determining, by the device, that the data is associated with a particular entry in the data structure, the particular entry identifying the particular address and a particular port associated with the particular address; and forwarding, by the device, the data to the particular port.

16. The method of claim 15, further comprising:
 storing the data structure as a media access control (MAC) table in a content-addressable memory; and
 identifying, in the particular entry of the entries contained in the data structure, a MAC address and a port associated with the MAC address, a particular time associated with the particular entry being associated with the device receiving data, via the port associated with the MAC address, from another device, the other device being associated with the MAC address.

17. The method of claim 15, further comprising:
 selecting the expiration threshold, from a list of expiration thresholds, based on the fullness level of the data structure.

18. The method of claim 15, where determining the expiration threshold comprises: determining the expiration threshold based on providing a value representing the fullness level as an input to a mathematical expression.

19. The method of claim 15, further comprising:
identifying a first set of entries of the entries in the data structure, the first quantity of entries being identified from the first set of entries, and the second quantity of entries being randomly selected from the first set of entries;
identifying a second set of entries of the entries in the data structure,
the second set of entries being different from the first set of entries, and
the second set of entries being associated with a virtual switch;
determining another expiration threshold, the other expiration threshold being associated with the fullness level; identifying a third quantity of entries, of the second set of entries, based on times associated with the third quantity of entries satisfying the other expiration threshold; removing the third quantity of entries from the data structure; determining another probability, the other probability being associated with the fullness level; randomly selecting, based on the other probability, a fourth quantity of entries of the second set of entries; and removing the fourth quantity of entries from the data structure.

20. The method of claim 15, further comprising:
identifying a set of ports, the set of ports being associated with a corresponding set of probabilities; and randomly selecting an entry, of the second quantity of entries, based on a particular probability, of the set of probabilities, corresponding to a port identified by the entry.

* * * * *